(12) United States Patent
Moorer et al.

(10) Patent No.: US 8,155,142 B2
(45) Date of Patent: Apr. 10, 2012

(54) NETWORK BASED DIGITAL ACCESS POINT DEVICE

(75) Inventors: Seale Moorer, Westerville, OH (US); Eric Eichensehr, Westerville, OH (US)

(73) Assignee: Exceptional Innovation LLC, Westerville, OH (US)

( * ) Notice: Subject to any disclaimer, the term of this patent is extended or adjusted under 35 U.S.C. 154(b) by 1390 days.

(21) Appl. No.: 11/686,826

(22) Filed: Mar. 15, 2007

(65) Prior Publication Data

US 2007/0217446 A1 Sep. 20, 2007

Related U.S. Application Data

(60) Provisional application No. 60/782,734, filed on Mar. 16, 2006, provisional application No. 60/782,596, filed on Mar. 16, 2006, provisional application No. 60/782,598, filed on Mar. 16, 2006, provisional application No. 60/782,635, filed on Mar. 16, 2006, provisional application No. 60/782,599, filed on Mar. 16, 2006, provisional application No. 60/782,600, filed on Mar. 16, 2006, provisional application No. 60/782,634, filed on Mar. 16, 2006, provisional application No. 60/782,595, filed on Mar. 16, 2006, provisional application No. 60/785,275, filed on Mar. 24, 2006, provisional application No. 60/793,257, filed on Apr. 20, 2006, provisional application No. 60/747,726, filed on May 19, 2006, provisional application No. 60/746,287, filed on May 3, 2006, provisional application No. 60/786,119, filed on Mar. 27, 2006, provisional application No. 60/857,774, filed on Nov. 9, 2006.

(51) Int. Cl.
*H04L 12/66* (2006.01)

(52) U.S. Cl. ............ 370/463; 370/350; 370/401
(58) Field of Classification Search .......... 370/350, 370/463, 401
See application file for complete search history.

(56) References Cited

U.S. PATENT DOCUMENTS

| | | |
|---|---|---|
| 4,567,557 A | 1/1986 | Burns |
| 4,808,841 A | 2/1989 | Ito et al. |
| 4,989,081 A | 1/1991 | Miyagawa et al. |
| 5,086,385 A | 2/1992 | Launey et al. |
| 5,105,186 A | 4/1992 | May |
| 5,218,552 A | 6/1993 | Stirk et al. |
| 5,237,305 A | 8/1993 | Ishikuro et al. |
| 5,282,028 A | 1/1994 | Johnson et al. |
| 5,502,618 A | 3/1996 | Chiou |
| 5,565,894 A | 10/1996 | Bates et al. |
| 5,579,221 A | 11/1996 | Mun |
| 5,598,523 A | 1/1997 | Fujita |
| 5,621,662 A | 4/1997 | Humphries et al. |
| 5,623,392 A | 4/1997 | Ma |
| 5,666,172 A | 9/1997 | Ida et al. |
| 5,706,191 A | 1/1998 | Bassett et al. |
| 5,706,290 A | 1/1998 | Shaw et al. |
| 5,748,444 A | 5/1998 | Honda et al. |
| 5,787,259 A | 7/1998 | Haroun et al. |
| 5,831,823 A | 11/1998 | Hoedl |
| 5,850,340 A | 12/1998 | York |

(Continued)

*Primary Examiner* — Ricky Ngo
*Assistant Examiner* — Dewanda Samuel
(74) *Attorney, Agent, or Firm* — Baker & Hostetler LLP

(57) ABSTRACT

An internet-protocol (IP) based digital audio device having a network interface receiving a digital audio signal from an IP network and implemented with web services for devices. The digital audio device further includes a digital to analog (D/A) converter connected to the network interface converting the digital audio signal to an analog audio signal, and an amplifier connected to the D/A converter and amplifying the analog audio signal from the D/A converter.

15 Claims, 10 Drawing Sheets

U.S. PATENT DOCUMENTS

| | | | |
|---|---|---|---|
| 5,877,957 A | 3/1999 | Bennett |
| 5,922,047 A | 7/1999 | Newlin et al. |
| 5,956,025 A | 9/1999 | Goulden et al. |
| 6,020,881 A | 2/2000 | Naughton et al. |
| 6,029,092 A | 2/2000 | Stein |
| 6,061,602 A | 5/2000 | Meyer |
| 6,112,127 A | 8/2000 | Bennett |
| 6,139,177 A | 10/2000 | Venkatraman et al. |
| 6,147,601 A | 11/2000 | Sandelman et al. |
| 6,154,681 A | 11/2000 | Drees et al. |
| 6,160,477 A | 12/2000 | Sandelman et al. |
| 6,175,872 B1 | 1/2001 | Neumann et al. |
| 6,182,094 B1 | 1/2001 | Humpleman et al. |
| 6,192,282 B1 | 2/2001 | Smith et al. |
| 6,198,479 B1 | 3/2001 | Humpleman et al. |
| 6,201,523 B1 | 3/2001 | Akiyama et al. |
| 6,222,729 B1 | 4/2001 | Yoshikawa |
| 6,243,707 B1 | 6/2001 | Humpleman et al. |
| 6,263,260 B1 | 7/2001 | Bodmer et al. |
| 6,268,857 B1 | 7/2001 | Fishkin et al. |
| 6,275,922 B1 | 8/2001 | Bertsch |
| 6,278,676 B1 | 8/2001 | Anderson et al. |
| 6,288,716 B1 | 9/2001 | Humpleman et al. |
| 6,313,990 B1 | 11/2001 | Cheon |
| 6,314,326 B1 | 11/2001 | Fuchu |
| 6,353,853 B1 | 3/2002 | Gravlin |
| 6,385,495 B1 | 5/2002 | Bennett |
| 6,389,331 B1 | 5/2002 | Jensen et al. |
| 6,402,109 B1 | 6/2002 | Dittmer |
| 6,405,103 B1 | 6/2002 | Ryan et al. |
| 6,456,892 B1 | 9/2002 | Dara-Abrams et al. |
| 6,462,654 B1 | 10/2002 | Sandelman et al. |
| 6,473,661 B1 | 10/2002 | Wollner |
| 6,496,575 B1 | 12/2002 | Vasell et al. |
| 6,522,346 B1 | 2/2003 | Meyer |
| 6,523,696 B1 | 2/2003 | Saito et al. |
| 6,526,581 B1 | 2/2003 | Edson |
| 6,546,419 B1 | 4/2003 | Humpleman et al. |
| 6,580,950 B1 | 6/2003 | Johnson et al. |
| 6,587,739 B1 | 7/2003 | Abrams et al. |
| 6,609,038 B1 | 8/2003 | Croswell et al. |
| 6,615,088 B1 | 9/2003 | Myer et al. |
| 6,633,781 B1 | 10/2003 | Lee et al. |
| 6,640,141 B2 | 10/2003 | Bennett |
| 6,663,781 B1 | 12/2003 | Huling et al. |
| 6,690,411 B2 | 2/2004 | Naidoo et al. |
| 6,690,979 B1 | 2/2004 | Smith |
| 6,735,619 B1 | 5/2004 | Sawada |
| 6,756,998 B1 | 6/2004 | Bilger |
| 6,763,040 B1 | 7/2004 | Hite et al. |
| 6,778,868 B2 | 8/2004 | Imamura et al. |
| 6,782,294 B2 | 8/2004 | Reich et al. |
| 6,792,319 B1 | 9/2004 | Bilger |
| 6,792,323 B2 | 9/2004 | Krzyzanowski et al. |
| 6,792,480 B2 | 9/2004 | Chaiken et al. |
| 6,823,223 B2 | 11/2004 | Gonzales et al. |
| 6,834,208 B2 | 12/2004 | Gonzales et al. |
| 6,838,978 B2 | 1/2005 | Aizu et al. |
| 6,845,275 B2 | 1/2005 | Behm et al. |
| 6,850,149 B2 | 2/2005 | Park |
| 6,859,669 B2 | 2/2005 | An |
| 6,865,428 B2 | 3/2005 | Gonzales et al. |
| 6,868,292 B2 | 3/2005 | Ficco et al. |
| 6,868,293 B1 | 3/2005 | Schurr et al. |
| 6,870,555 B2 | 3/2005 | Sekiguchi |
| 6,891,838 B1 | 5/2005 | Petite et al. |
| 6,909,921 B1 | 6/2005 | Bilger |
| 6,912,429 B1 | 6/2005 | Bilger |
| 6,924,727 B2 * | 8/2005 | Nagaoka et al. ............... 340/3.1 |
| 6,928,576 B2 | 8/2005 | Sekiguchi |
| 6,930,599 B2 | 8/2005 | Naidoo et al. |
| 6,957,110 B2 | 10/2005 | Wewalaarachchi et al. |
| 6,957,275 B1 | 10/2005 | Sekiguchi |
| 6,961,763 B1 | 11/2005 | Wang et al. |
| 6,965,935 B2 | 11/2005 | Diong |
| 6,967,565 B2 | 11/2005 | Lingemann |
| 6,980,868 B2 | 12/2005 | Huang et al. |
| 6,990,379 B2 | 1/2006 | Gonzales et al. |
| 7,047,092 B2 | 5/2006 | Wimsatt |
| 7,130,719 B2 | 10/2006 | Ehlers et al. |
| 7,136,709 B2 | 11/2006 | Arling et al. |
| 7,170,422 B2 | 1/2007 | Nelson et al. |
| 7,174,385 B2 | 2/2007 | Li |
| 7,200,683 B1 | 4/2007 | Wang et al. |
| 7,201,356 B2 | 4/2007 | Huang |
| 7,203,486 B2 | 4/2007 | Patel |
| 7,225,037 B2 | 5/2007 | Shani |
| 7,260,604 B2 | 8/2007 | Kuki |
| 7,370,280 B2 | 5/2008 | Ho et al. |
| 7,380,250 B2 | 5/2008 | Schechter et al. |
| 7,453,685 B2 | 11/2008 | Lube |
| 7,505,889 B2 | 3/2009 | Salmonsen et al. |
| 2001/0034754 A1 | 10/2001 | Elwahab et al. |
| 2001/0036192 A1 | 11/2001 | Chiles et al. |
| 2001/0039460 A1 | 11/2001 | Aisa |
| 2002/0000092 A1 | 1/2002 | Sharood et al. |
| 2002/0016639 A1 | 2/2002 | Smith et al. |
| 2002/0029085 A1 | 3/2002 | Park |
| 2002/0031120 A1 | 3/2002 | Rakib |
| 2002/0033760 A1 | 3/2002 | Kobayashi |
| 2002/0035404 A1 | 3/2002 | Ficco et al. |
| 2002/0044042 A1 | 4/2002 | Christensen et al. |
| 2002/0047774 A1 | 4/2002 | Christensen et al. |
| 2002/0111698 A1 | 8/2002 | Graziano et al. |
| 2002/0126443 A1 | 9/2002 | Zodnik |
| 2002/0152311 A1 | 10/2002 | Veltman et al. |
| 2002/0165953 A1 | 11/2002 | Diong |
| 2002/0174178 A1 | 11/2002 | Stawikowski |
| 2002/0180579 A1 | 12/2002 | Nagaoka et al. |
| 2002/0194328 A1 | 12/2002 | Hallenbeck |
| 2002/0196158 A1 | 12/2002 | Lee |
| 2003/0009515 A1 | 1/2003 | Lee et al. |
| 2003/0009537 A1 | 1/2003 | Wang |
| 2003/0028270 A1 | 2/2003 | Peterson et al. |
| 2003/0033028 A1 | 2/2003 | Bennett |
| 2003/0034898 A1 | 2/2003 | Shamoon et al. |
| 2003/0037166 A1 | 2/2003 | Ueno et al. |
| 2003/0040812 A1 | 2/2003 | Gonzales et al. |
| 2003/0040813 A1 | 2/2003 | Gonzales et al. |
| 2003/0040819 A1 | 2/2003 | Gonzales et al. |
| 2003/0065407 A1 | 4/2003 | Johnson et al. |
| 2003/0069887 A1 | 4/2003 | Lucovsky et al. |
| 2003/0074088 A1 | 4/2003 | Gonzales et al. |
| 2003/0083758 A1 | 5/2003 | Williamson |
| 2003/0101304 A1 | 5/2003 | King et al. |
| 2003/0103088 A1 | 6/2003 | Dresti et al. |
| 2003/0198938 A1 | 10/2003 | Murray et al. |
| 2003/0200009 A1 | 10/2003 | von Kannewurff |
| 2003/0233432 A1 | 12/2003 | Davis et al. |
| 2004/0003051 A1 | 1/2004 | Krzyzanowski et al. |
| 2004/0004810 A1 | 1/2004 | Kim |
| 2004/0010327 A1 | 1/2004 | Terashima et al. |
| 2004/0010561 A1 | 1/2004 | Kim et al. |
| 2004/0039459 A1 | 2/2004 | Daugherty et al. |
| 2004/0092282 A1 | 5/2004 | Kim et al. |
| 2004/0133314 A1 | 7/2004 | Ehlers et al. |
| 2004/0138768 A1 | 7/2004 | Murray et al. |
| 2004/0143629 A1 | 7/2004 | Bodin et al. |
| 2004/0176877 A1 | 9/2004 | Hesse et al. |
| 2004/0213384 A1 | 10/2004 | Alles et al. |
| 2004/0215694 A1 | 10/2004 | Podolsky |
| 2004/0215778 A1 | 10/2004 | Hesse et al. |
| 2004/0215816 A1 | 10/2004 | Hayes et al. |
| 2004/0237107 A1 | 11/2004 | Staples |
| 2004/0243257 A1 | 12/2004 | Theimer |
| 2004/0249922 A1 | 12/2004 | Hackman et al. |
| 2004/0260407 A1 | 12/2004 | Wimsatt |
| 2004/0260427 A1 | 12/2004 | Wimsatt |
| 2004/0266439 A1 | 12/2004 | Lynch, Jr. et al. |
| 2004/0267385 A1 | 12/2004 | Lingemann |
| 2004/0267876 A1 * | 12/2004 | Kakivaya et al. ............. 709/200 |
| 2004/0267909 A1 | 12/2004 | Autret |
| 2005/0009498 A1 | 1/2005 | Ho et al. |
| 2005/0021805 A1 | 1/2005 | Petris |
| 2005/0035717 A1 | 2/2005 | Adamson et al. |
| 2005/0055108 A1 | 3/2005 | Gonzales et al. |
| 2005/0071419 A1 | 3/2005 | Lewontin |

| | | | | | |
|---|---|---|---|---|---|
| 2005/0080879 A1* | 4/2005 | Kim et al. .................... 709/219 | 2005/0267605 A1* | 12/2005 | Lee et al. ................ 700/19 |
| 2005/0085930 A1 | 4/2005 | Gonzales et al. | 2005/0271355 A1 | 12/2005 | Gilor |
| 2005/0090915 A1 | 4/2005 | Geiwitz | 2006/0004920 A1 | 1/2006 | Hallenbeck |
| 2005/0096753 A1 | 5/2005 | Arling et al. | 2006/0009861 A1 | 1/2006 | Bonasia et al. |
| 2005/0107897 A1 | 5/2005 | Callaghan | 2006/0020353 A1 | 1/2006 | Gonzales et al. |
| 2005/0108091 A1 | 5/2005 | Sotak et al. | 2006/0053234 A1 | 3/2006 | Kumar et al. |
| 2005/0113021 A1 | 5/2005 | Gosieski et al. | 2006/0058900 A1 | 3/2006 | Johanson et al. |
| 2005/0113943 A1 | 5/2005 | Nian | 2006/0069934 A1 | 3/2006 | Esch et al. |
| 2005/0119767 A1 | 6/2005 | Kiwimagi et al. | 2006/0106933 A1 | 5/2006 | Huang et al. |
| 2005/0119793 A1 | 6/2005 | Amundson et al. | 2006/0118694 A1 | 6/2006 | Lee et al. |
| 2005/0125083 A1 | 6/2005 | Kiko | 2006/0126646 A1 | 6/2006 | Bedingfield |
| 2005/0131551 A1 | 6/2005 | Ruutu et al. | 2006/0155802 A1 | 7/2006 | He et al. |
| 2005/0131553 A1 | 6/2005 | Yoon et al. | 2007/0053376 A1* | 3/2007 | Oshima et al. ............. 370/462 |
| 2005/0131558 A1 | 6/2005 | Braithwaite et al. | 2007/0073419 A1 | 3/2007 | Sesay |
| 2005/0132405 A1 | 6/2005 | AbiEzzi et al. | 2007/0083679 A1 | 4/2007 | Kikuchi |
| 2005/0149758 A1* | 7/2005 | Park ............................ 713/201 | 2007/0104332 A1 | 5/2007 | Clemens et al. |
| 2005/0159823 A1* | 7/2005 | Hayes et al. .................... 700/19 | 2007/0153459 A1* | 7/2007 | Wohlford et al. ............ 361/681 |
| 2005/0172056 A1* | 8/2005 | Ahn ................................ 710/72 | 2007/0162567 A1 | 7/2007 | Ding |
| 2005/0198063 A1 | 9/2005 | Thomas et al. | 2007/0203979 A1* | 8/2007 | Walker et al. ............... 709/204 |
| 2005/0198188 A1 | 9/2005 | Hickman | 2007/0247800 A1 | 10/2007 | Smith et al. |
| 2005/0198304 A1 | 9/2005 | Oliver et al. | 2008/0108439 A1 | 5/2008 | Cole |
| 2005/0232583 A1 | 10/2005 | Kubota | | | |
| 2005/0262227 A1 | 11/2005 | Heller et al. | | | |

\* cited by examiner

NETWORK BASED DIGITAL ACCESS POINT DEVICE

CROSS REFERENCE TO RELATED APPLICATION

This application claims priority to and the benefit of: Provisional Patent Application No. 60/782,734 filed on Mar. 16, 2006, entitled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTIONS, AND EVENTING THAT IS CONTROLLABLE WITH A TOUCH-SCREEN DISPLAY, to Seale MOORER et al.; Provisional Patent Application No. 60/782,596 filed on Mar. 16, 2006, entitled AUTOMATION CONTROL SYSTEM HAVING DIGITAL MEDIA STREAMING, to Seale MOORER et al.; Provisional Patent Application No. 60/782,598 filed on Mar. 16, 2006, entitled AUTOMATION CONTROL SYSTEM HAVING DIGITAL LOGGING, to Seale MOORER et al.; Provisional Patent Application No. 60/782,635 filed on Mar. 16, 2006, entitled AUTOMATION CONTROL SYSTEM HAVING A CONTROL PANEL, to Seale MOORER et al.; Provisional Patent Application No. 60/782,599 filed on Mar. 16, 2006, entitled AUTOMATION CONTROL SYSTEM HAVING A CONFIGURATION TOOL, to Seale MOORER et al.; Provisional Patent Application No. 60/782,600 filed on Mar. 16, 2006, entitled AUTOMATION CONTROL SYSTEM HAVING DEVICE SCRIPTING, to Seale MOORER et al.; Provisional Patent Application No. 60/782,634 filed on Mar. 16, 2006, entitled DEVICE AUTOMATION USING NETWORKED DEVICE CONTROL HAVING A WEB SERVICES FOR DEVICE STACK, to Seale MOORER et al.; Provisional Patent Application No. 60/782,595 filed on Mar. 16, 2006, entitled WIRELESS DIGITAL AMPLIFIER CONFIGURED FOR WALL MOUNTING, SHELF MOUNTING, AND THE LIKE, to Seale MOORER et al.; Provisional Patent Application No. 60/785,275 filed on Mar. 24, 2006, entitled AUTOMATION SYSTEM, to Seale MOORER et al.; Provisional Patent Application No. 60/793,257 filed on Apr. 20, 2006, entitled TOUCH SCREEN FOR USE WITH AUTOMATION SYSTEMS, to Seale MOORER et al.; Provisional Patent Application No. 60/747,726 filed on May 19, 2006, entitled COOLING DEVICE FOR A TOUCH SCREEN AND THE LIKE, to Seale MOORER et al.; Provisional Patent Application No. 60/746,287 filed on May 3, 2006, entitled HOME AUTOMATION SYSTEM AND THE LIKE, to Seale MOORER et al.; Provisional Patent Application No. 60/786,119 filed on Mar. 27, 2006, entitled HOME AUTOMATION PROGRAM CODE FOR SET TOP BOX OR SIMILAR CIRCUIT, to Steve CASHMAN; and Provisional Patent Application No. 60/857,774 filed Nov. 9, 2006, entitled PORTABLE MULTI-FUNCTIONAL MEDIA DEVICE, to Seale MOORER et al., all of which are hereby expressly incorporated by reference for all purposes as if fully set forth herein. Further, this application is related to the following U.S. patent applications: U.S. patent application Ser. No. 11/686,836, entitled INTERNET PROTOCOL BASED MEDIA STREAMING SOLUTION, filed Mar. 15, 2007, to Seale Moorer, et al.; U.S. patent application Ser. No. 11/686,896, titled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTION, AND EVENTING THAT IS CONTROLLABLE WITH A TOUCH-SCREEN DISPLAY, filed Mar. 15, 2007 and issued as U.S. Pat. No. 7,509,402, to Seale Moorer, et al.; U.S. patent application Ser. No. 11/686,884, entitled AUTOMATION CONTROL SYSTEM HAVING DIGITAL LOGGING, filed Mar. 15, 2007 and issued as U.S. Pat. No. 7,496,627, to Seale Moorer, et al.; U.S. patent application Ser. No. 11/686,893, entitled USER CONTROL INTERFACE FOR CONVERGENCE AND AUTOMATION SYSTEM, filed Mar. 15, 2007, to Seale Moorer, et al.; U.S. patent application Ser. No. 11/686,846, entitled DEVICE AUTOMATION USING NETWORKED DEVICE CONTROL HAVING A WEB SERVICES FOR DEVICES STACK, filed Mar. 15, 2007, to Seale Moorer, et al.; U.S. patent application Ser. No. 11/686,875, entitled AUTOMATION CONTROL SYSTEM HAVING A CONFIGURATION TOOL, filed Mar. 15, 2007, to Seale Moorer, et al.; and U.S. patent application Ser. No. 11/686,889, entitled AUTOMATION CONTROL SYSTEM HAVING DEVICE SCRIPTING, filed Mar. 15, 2007, to Seale Moorer, et al., which are all hereby expressly incorporated by reference for all purposes as if fully set forth herein.

BACKGROUND OF THE INVENTION

1. Field of the Invention

The invention is directed to wireless audio and video devices and systems, and more particularly to network-based digital audio/video amplifiers, wireless access points and systems, and similar devices.

2. Related Art

Households or businesses now more commonly have more than one audio or video device such as CD/DVD player, portable MP3 player, tuner, preamp, power amp, speakers, VCR, DVR, computers running media players or connected to some other source of audio or video (e.g., Internet radio, satellite radio and the like), etc. Typically, a CD/DVD player from one company comes with its own remote control and an amplifier by an entirely different company comes with its own remote control. The same household may have a PC with its keyboard and mouse, and yet another company's portable MP3 player with its own control switches. While each audio device is doing precisely what it was designed to do, each operates completely independent from the others with the possible exception of the portable MP3 player that may be connected to a PC for synchronization. As a result, a user ends up going from one keypad to another or juggling a series of remote controls in order to control the devices.

Since these audio/video and similar devices are not designed to communicate with each other or their communication is very limited, access to these audio/video devices is limited by their physical locations. For example, it is difficult to play an MP3 file saved in a PC hard disk drive in a child's bedroom on speakers located in an entertainment room. Thus, in order for a user to enjoy music of his or her choice whenever and wherever he or she wants, each room needs to be equipped with all the necessary audio/video equipment and digital audio/video content.

Also, the audio/video devices are not designed to communicate with other home devices (e.g., TV, lighting, security system, etc.). Thus, it is difficult, if not impossible, to converge the devices for common control for certain occasions. For example, in order to watch a movie, the user must turn on a TV, a DVD player and an audio amplifier by using three different remote controls. Then the user must set the TV to receive a video signal from the DVD player, set the audio amplifier to receive an audio signal from the DVD player and use another control unit to adjust the lighting of the room. Even when a user utilizes a universal remote as is known in the art, the result is a plurality of devices that are separately operated and are operated separately from a single universal remote. These devices do not converge as described above.

Accordingly, there are needs for better accessibility, connectablity and convergence of control of media and similar devices in order to access media content and/or distributed media content.

SUMMARY OF THE INVENTION

The invention meets the foregoing needs and provides significantly improved accessibility, connectability, convergence benefits and other advantages apparent from the discussion herein.

Accordingly, in one aspect of the invention, an internet-protocol (IP) based media access device implemented with web services for devices (WSD) protocol may include a network interface connected to and configured to receive a first source of media data from an IP network implemented with the WSD protocol, at least one media terminal configured to at least one of output a signal based on the media data from the first source and receive a media input based on media received from a second source of media data, and at least one converter coupled between the network interface and the media terminal. The converter may be configured to at least one of convert the first source of media data from a digital format to an analog format and convert the second source of media data from an analog format to a digital format.

The media device may further include an amplifier connected to the converter to amplify the media data from the converter, and at least one speaker-out terminal connected to the amplifier. Also, the first and second sources of media data may be at least one of video, audio, moving picture, voice and gaming data.

According to another aspect of the invention, an IP based media access device implemented with the WSD protocol may include a network interface connected to and configured to receive a first source of media data from an IP network implemented with the WSD protocol, a processor running an operating system and an application program configured to implement the WSD protocol, and at least one media terminal configured to at least one of output a signal based on the media data from the first source and receive a media input based on media received from a second source of media data.

The media access device may further include a converter coupled between the network interface and the at least one media terminal and configured to at least one of convert the first source of data from a digital format to an analog format or convert the second source of media data from an analog format to a digital format.

The media access device may further include an amplifier connected to the converter and configured to amplify the media data from the converter and at least one speaker-out terminal connected to the amplifier.

Additional features of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

Figure 1:
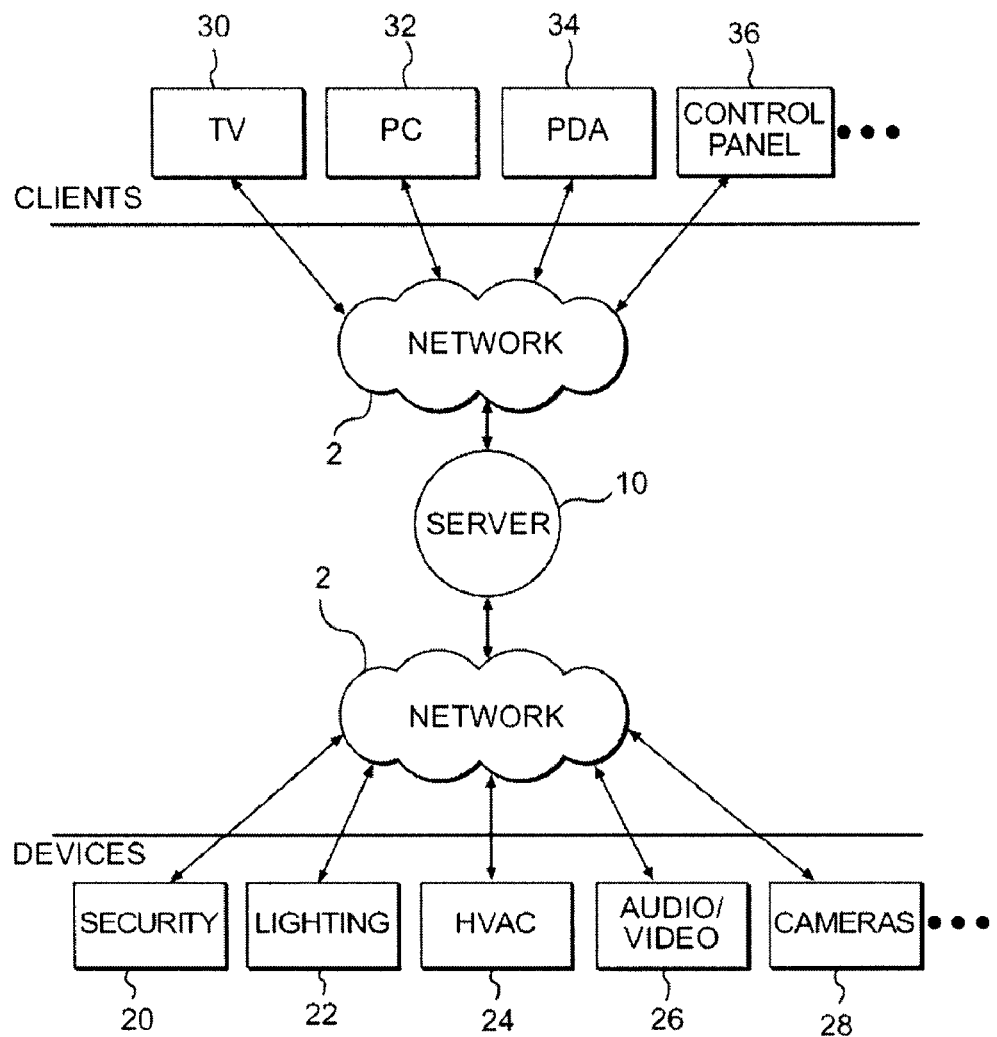
FIG. 1 schematically shows an overview of a convergence solution constructed according to the principles of the invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

FIG. 1 schematically shows an overview of a convergence solution constructed according to the principles of the invention. The convergence solution may be a combination of hardware and software. The hardware may include a server 10, clients (e.g., TV 30, PC 32, PDA 34, control panel 36, game controller, such as a X-box™ (not shown) and the like), devices (e.g., security system 20, lighting 22, HVAC 24, audio/video device 26, cameras 28 and the like) and at least one network (e.g., IP based wired or wireless network such as local area network (LAN), wide area network (WAN) or the like). The server 10 may be any type of computer, such as a personal computer (PC) connected to the network. The clients provide a user with control of the devices.

The software (i.e., application) enables the hardware to communicate with each other despite their different proprietary languages and communication protocols, and may provide the user with control of the hardware from a single client. The application may utilize at least one portion of the hardware to send commands to the devices and receive feedback from them. The application integrates centralized device control into a PC based media environment (e.g., Microsoft™ Media Center™ environment) that may store, organize and play digital media content. The user may use the same remote control to listen to music, watch and record television, enjoy family photographs and home movies, as well as adjust the lighting, secure the home, adjust the temperature, distribute music throughout the house, check surveillance cameras and the like. Similarly, the software provides convergence in business and academic spaces with similar functionality.

The application is particularly designed to be implemented with the web services for devices (WSD) protocol, which is developed by Microsoft™ to enable "software-to-software" communication among different devices. The WSD protocol may use standard Internet protocol (IP) and may be based on standard XML-related technologies such as SOAP (Simple Object Access Protocol) for communications and WSDL (Web Services Device Language) to describe interfaces. The devices implemented with the WSD protocol become black boxes on the network, providing services to any application, on any platform, written in any language. Moreover, the use of the WSD protocol allows for Universal Plug and Play (UPnP) capabilities as is known.

Alternatively or additionally, if the server 10 or the PC 32 is running a SideShow™ enabled operating system such as Microsoft Windows Vista™, the devices may be configured as a SideShow™ device or equipped with "Gadget", which is a light-weight easy-to-use single-purpose application. A SideShow™ device or Gadget may communicate with any client or device implemented with the WSD protocol in the network via protocols according to SideShow™ XML communication specifications. Moreover, the server 10 or the PC 32 using Microsoft Windows Vista™ may be running a SideShow™ Gadget application running on the Microsoft Windows Vista™ computer providing a user interface rendering for the device that communicates with home control devices via the WSD technology.

Figure 2:
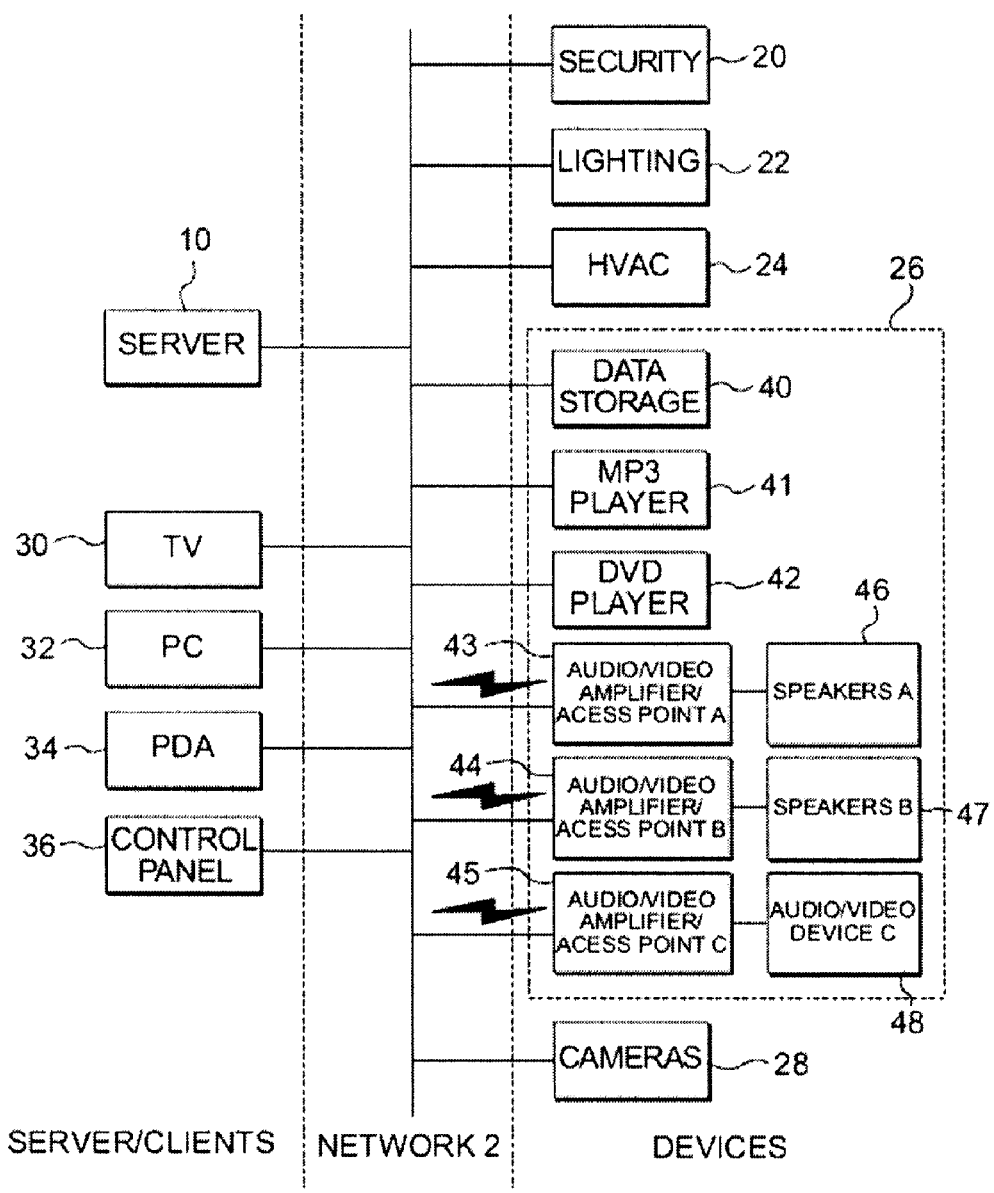
FIG. 2 schematically shows a digital audio/video system employing audio/video amplifiers/access points constructed according to principles of the invention and connected to a network for use in the convergence solution of FIG. 1.

FIG. 2 schematically shows a digital audio/video system constructed according to principles of the invention configured and connected to a network for use in the convergence solution of FIG. 1. More particularly, FIG. 2 shows an exemplary arrangement of the audio/video system 26 of FIG. 1 that may be configured and connected to the convergence system according to an embodiment of the invention. The audio/video device 26 may include various audio devices such as a data storage 40 storing, at least for example, digital audio/video content, a MP3 player 41, a DVD player 42, an audio/video amplifier/access point A 43, an audio/video amplifier/access point B 44, an audio/video amplifier/access point C 45, speakers A 46, speakers B 47, and speakers C 48. The data storage 40, MP3 player 41, DVD player 42, audio/video amplifier/access point A 43, audio/video amplifier/access point B 44, audio/video amplifier/access point C 45 may be connected to the network, and the speakers A 46, speakers B 47, and audio/video device C 48 may be connected to audio/video amplifier/access point A 43, audio/video amplifier/access point B 44, audio/video amplifier/access point C 45, respectively. These devices also may be implemented with the WSD protocol/gadgets, and the user may control these devices from any of the clients 30, 32, 34, 36.

For example, by using the TV 30 that may be arranged in a living room and its remote control, the user may select an MP3 file stored in the data storage 40 (e.g., computer hard disk drive) in a child's bedroom and play the file through the audio/video amplifier/access point A 43 and speaker A 46 in a dining room. Thus, according to the invention, the user may access music whenever and wherever he or she wants.

Also, since the devices can communicate with each other via the WSD protocol, the user can write a device control script for certain occasions. For example, the user may create a new setup or modify an existing setup for watching a movie such that the lighting 22 in an entertainment room may be adjusted to a predetermined level, the DVD player 42 and the audio amplifier B in the entertainment room may turn on to play a certain content at a certain volume. Thus, the invention may achieve true device convergence for the home, academic or business environment.

Figure 3:
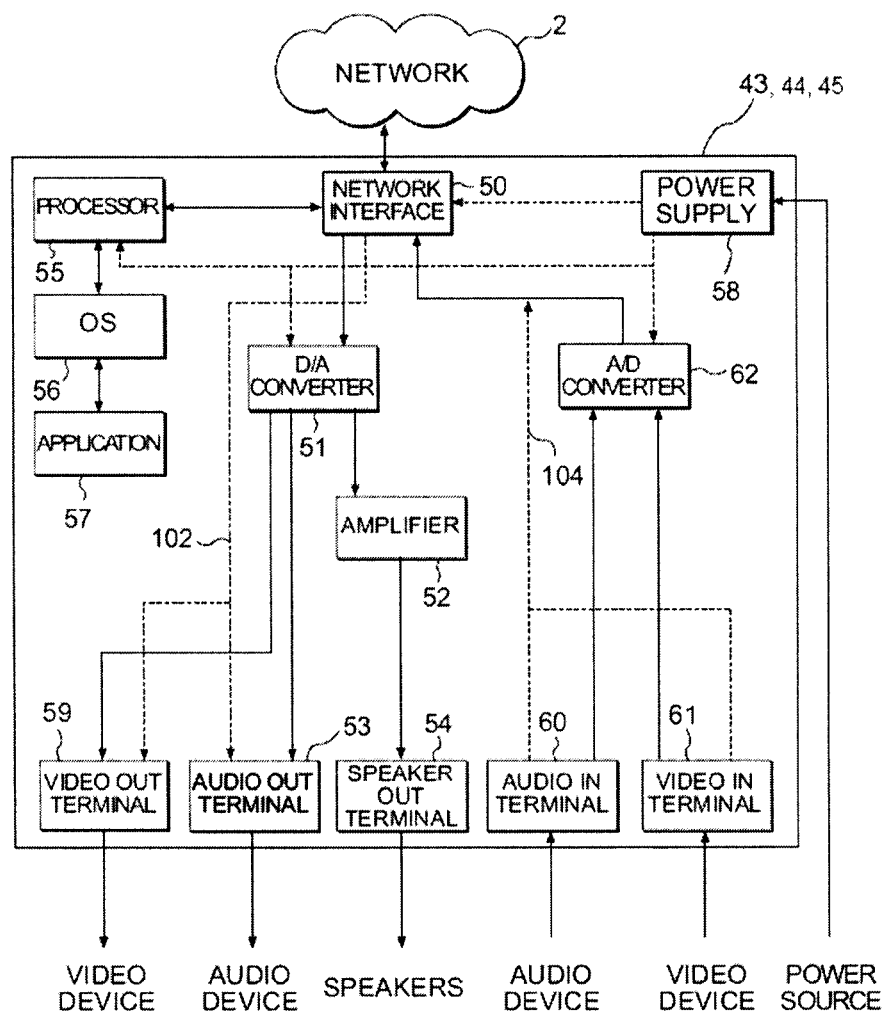
FIG. 3 schematically shows one embodiment of a structure of the digital audio/video amplifier/access point, constructed according to the principles of the invention that may be used in the system of FIG. 2.

FIG. 3 schematically shows a structure of the digital audio/video amplifier/access point, constructed according to the principles of the invention that may be used in the system of FIG. 2. More particularly, FIG. 3 shows exemplary structure of one of the audio/video amplifier/access point 43, 44, 45, such as the audio/video amplifier/access point 43 of FIG. 2, according to an embodiment of the invention. The audio/video amplifier/access point 43 may be equipped with a network interface 50 that allows the audio/video amplifier/access point 43 to communicate with the server 10, the clients 30, 32, 34, 36 and other devices 20, 22, 24, 28 of FIGS. 1 and 2 via a standard IP network 2. The network interface 50 may be a wired or wireless interface. The network interface 50 may receive a digital audio and/or video signal from the network 2. The digital audio/video signal from the network interface 50 may then be converted to an analog audio signal by an analog to digital (D/A) converter 51. The network interface 50 may connect using Wi-Fi (Wireless Fidelity IEEE 802.11x, Bluetooth™, FireWire™, power line, wired Ethernet, or the like, and any future protocols for data transmission.

The analog audio signal from the D/A converter 51 may be amplified by an amplifier 52 that may be connected to a speaker out terminal 54. The speakers A 46 of FIG. 2 may be connected to the speaker out terminal 54. Any type of speaker out is contemplated by the invention including a single terminal for one speaker, two terminals for two stereo speakers or multiple terminals for surround speakers (e.g., 5.1 or 7.1 surround sound protocol speaker connections). Optionally, the audio/video amplifier/access point 43 may be equipped with an audio out terminal 53, which may be connected to the D/A converter 51. The audio out terminal 53 may be provided for an external audio device that does not require or cannot receive an amplified audio signal. Any type of audio out is contemplated by the invention including any one or more of RCA, SPDIF, AES, EBU, TOSLINK, XLR interfaces or the like and any future protocols for audio signal transmission. The audio/video amplifier/access point 43 may be equipped with a video out terminal 59 for an external video device. Any kind of video out is contemplated by the invention including composite, s-video, component, HDMI (High Definition Multimedia Interface), DVI (Digital Video Interface) including DVI-A, DVI-D and DVI-I, IEEE 1394 (FireWire™), RGBHV, RGBS or the like and any future protocols for video signal transmission. If the external audio/video devices require digital audio/video signals, such digital signals from the network can bypass the D/A converter 51 and may be sent to the audio out terminal 53 and/or the video out terminal 59 along line 102.

Furthermore, the audio/video amplifier/access point 43 may be equipped with an audio in terminal 60 and/or a video in terminal 61 to connect an external audio/video source or device (e.g., DVD player, DVR, VCR, cable/satellite receiver, camcorder, surveillance camera, CD player, radio, MP3 player, PC, network storage device or the like) to the network 2. If the external audio/video device provides an analog signal, an A/D converter 62 may convert the analog signal to a digital signal. However, the A/D converter 62 may be bypassed if a digital signal is received from the external audio/video device along line 104. Similar to the audio out terminal 53 and the video out terminal 59, any type of audio in is contemplated by the invention including RCA, SPDIF, AES, EBU, TOSLINK, XLR interfaces or the like and any future protocols for audio signal transmission, and any kind of video in is contemplated by the invention including composite, s-video, component, HDMI (High Definition Multimedia Interface), DVI (Digital Video Interface) including DVI-A, DVI-D and DVI-I, IEEE 1394 (FireWire™), RGBHV, RGBS or the like and any future protocols for video signal transmission.

In order to operate the audio/video amplifier/access point 43, a power supply 58 may be connected to an external power source and provide power to various components of the audio/video amplifier/access point 43. The audio/video amplifier/access point 43 may be further equipped with a processor 55 that may run an operating system 56 and a web services/gadgets application 57. Thus, upon being connected to the network 2, the audio/video amplifier/access point 43 is recognized as a device and may be controlled by any one of the clients 30, 32, 34, 36 shown in FIG. 1.

Figure 4:
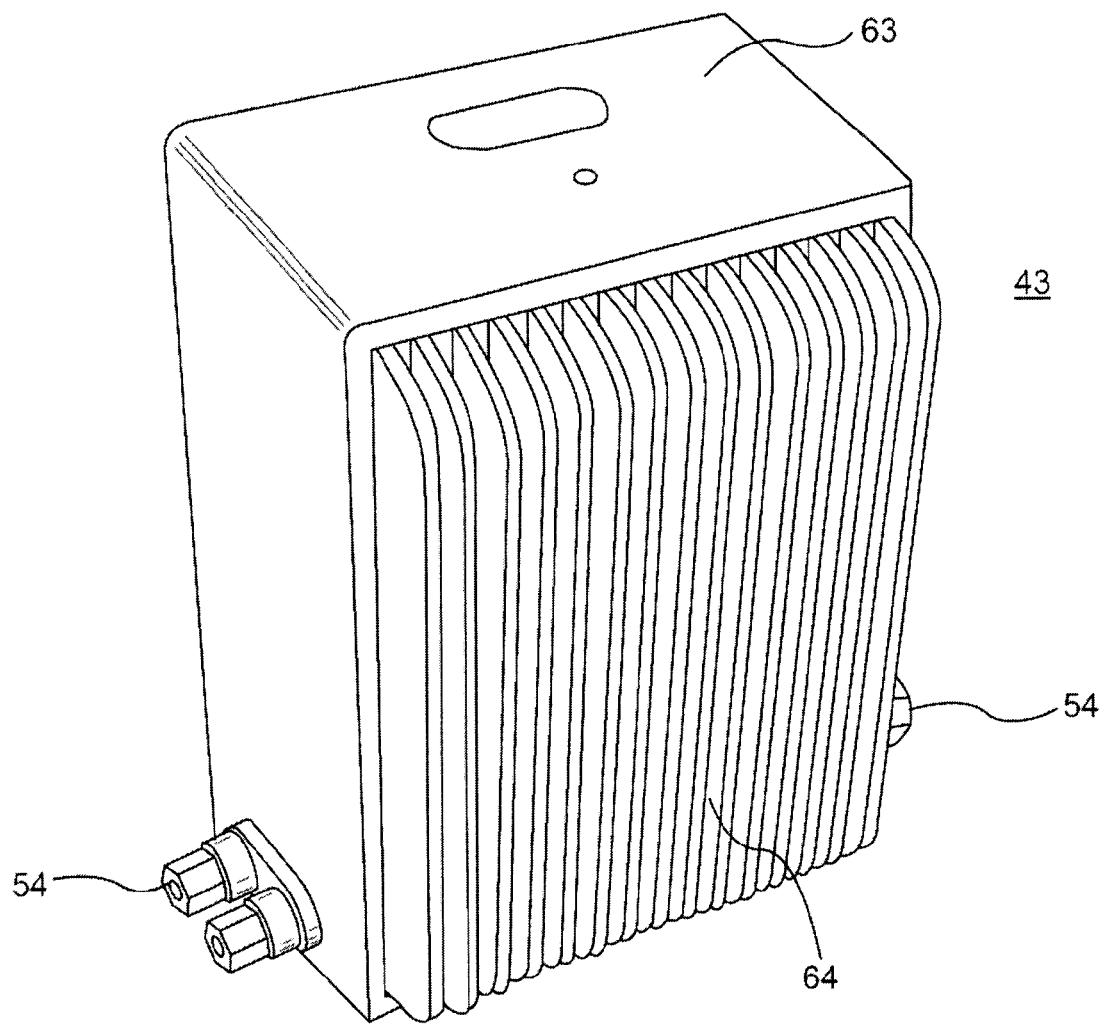
FIGS. 4 and 5 show the digital audio/video amplifier/access point of FIGS. 2 and 3 having a wall-plate form factor constructed according to the principles of the invention.
Figure 5:
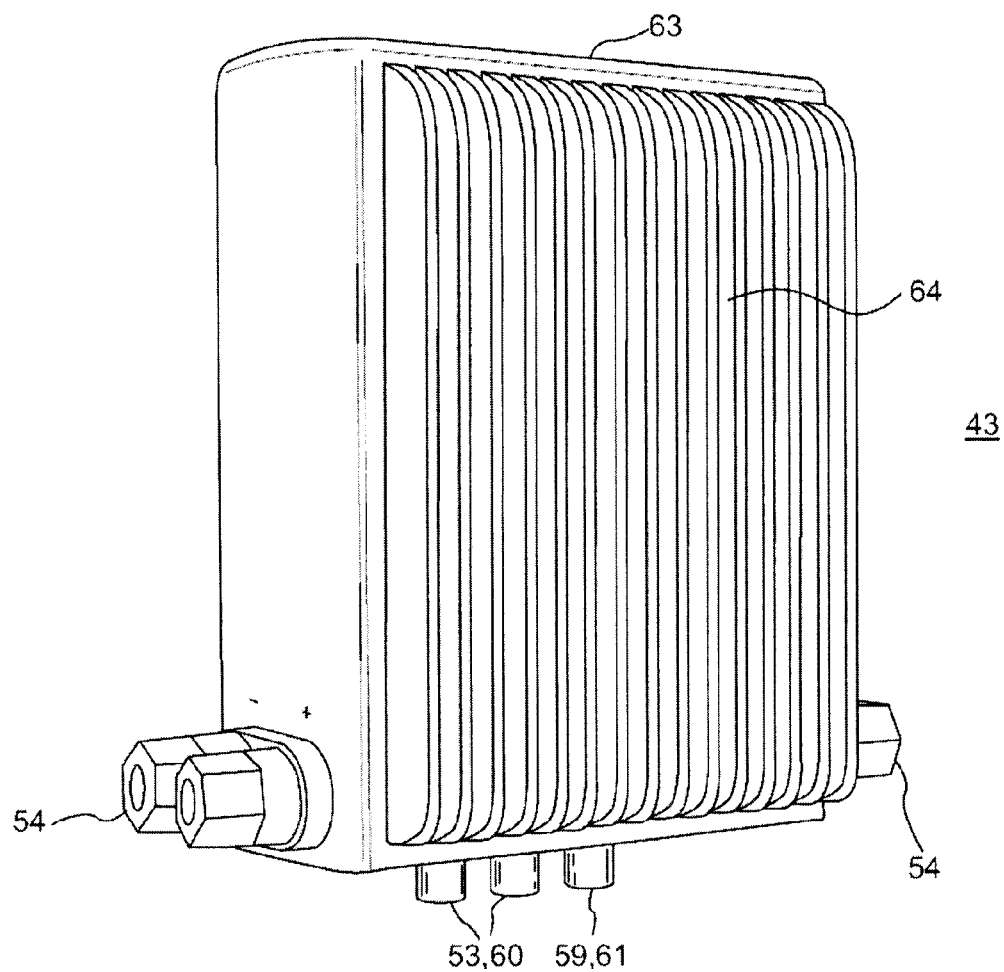

FIGS. 4, 5, 6, 7, 8, 9, and 10 show various form factors of the audio/video amplifier/access point 43, 44, 45, such as the audio/video amplifier/access point 43 of FIGS. 2 and 3. FIGS. 4 and 5 show the audio/video amplifier/access point 43 having a wall plate form factor. A housing 63 covers and protects the internal components, and a heat sink grill 64 may be formed on the front surface of the housing 63. Two speaker out terminals 54 may be arranged on both sides of the housing 63, respectively. The audio out terminals 53 and video out terminal 59 may be arranged on the bottom surface of the housing 63. These terminals may be the audio in terminals 60 and the video in terminal 61. On the back of the housing 63 is a standard U.S. 120v 60 Hz plug to provide power to the amplifier 43. Of course a power supply based on battery or Power Over Ethernet (POE) may be employed. Moreover, additional connections, fewer connections, or different connections are contemplated by the invention.

Figure 6:
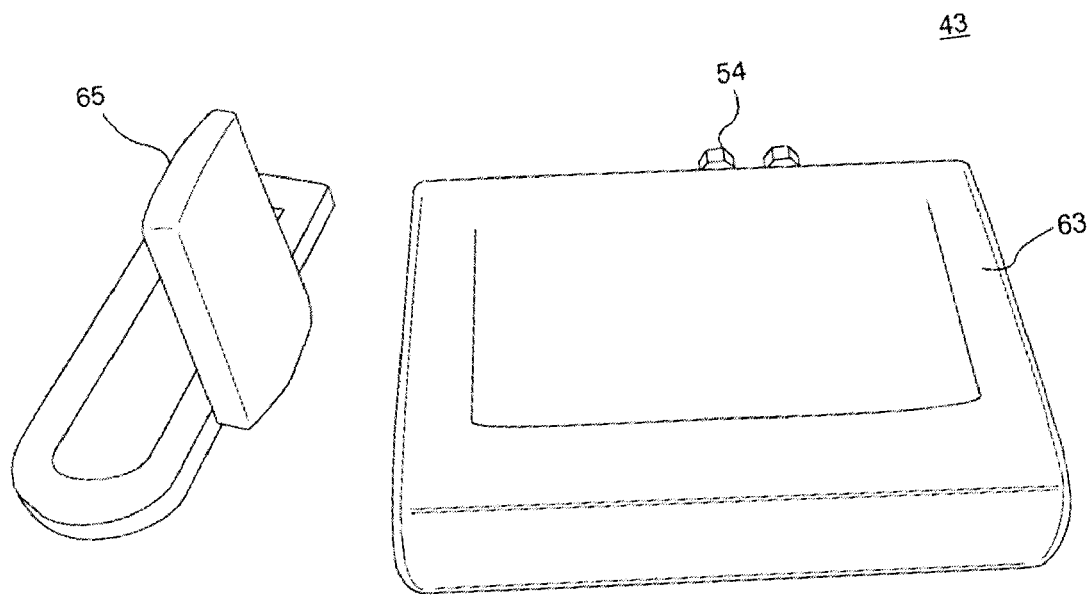
FIGS. 6, 7, 8, 9, and 10 show the digital audio/video amplifier/access point of FIGS. 2 and 3 having a book-end form factor constructed according to the principles of the invention.
Figure 7:
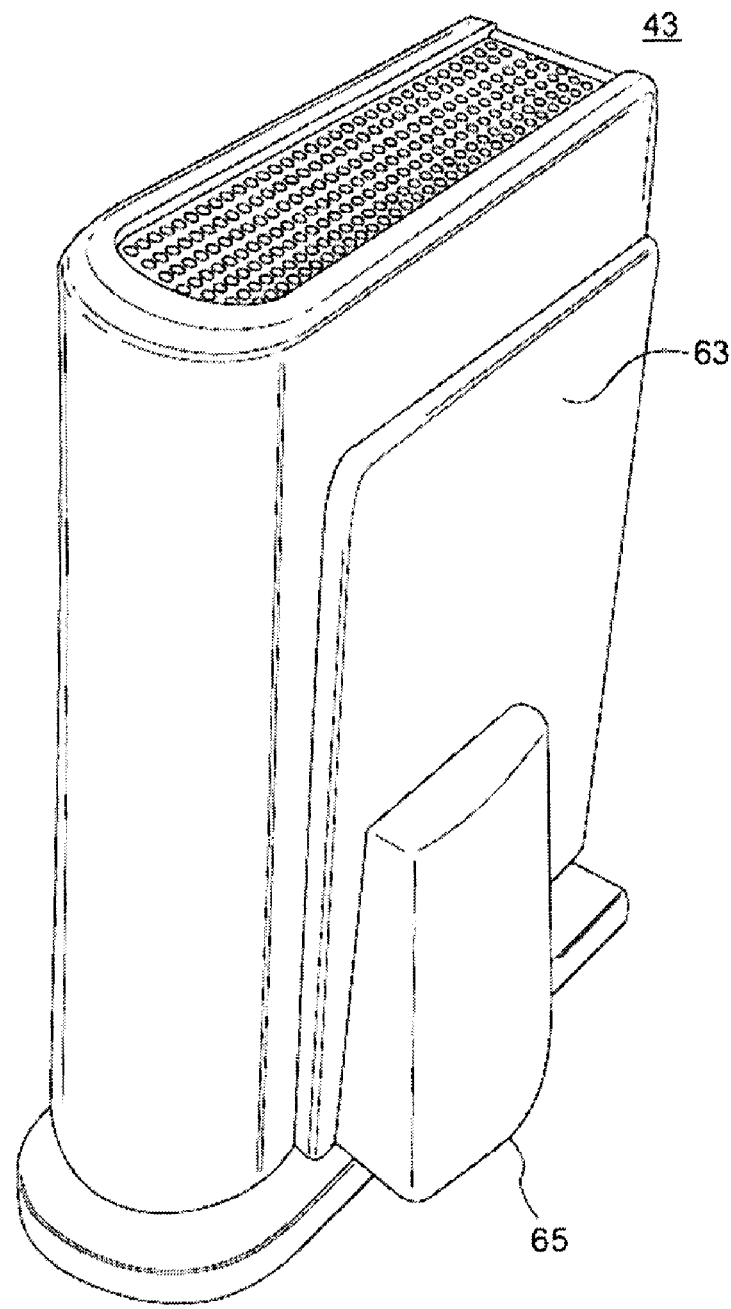
Figure 8:
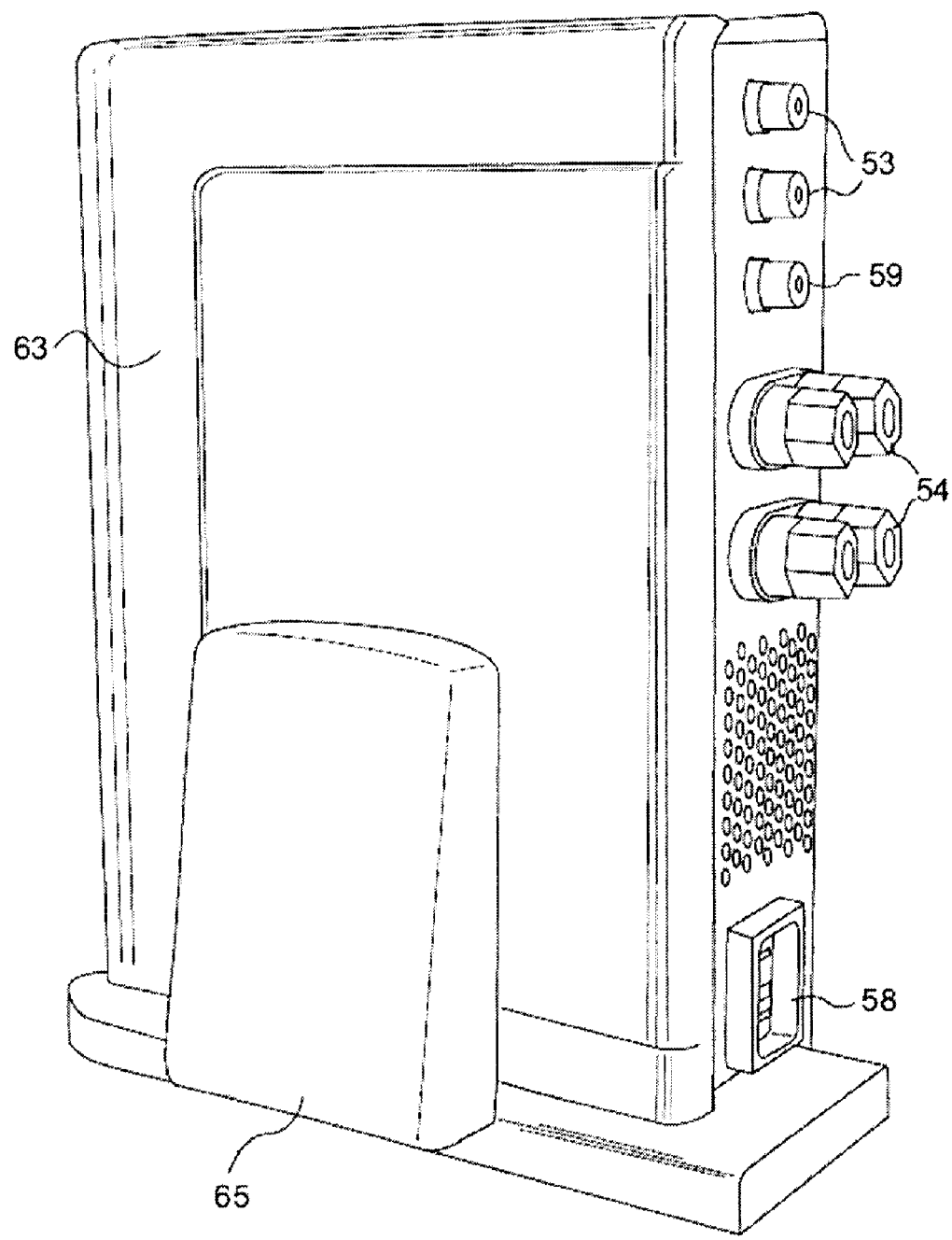
Figure 9:
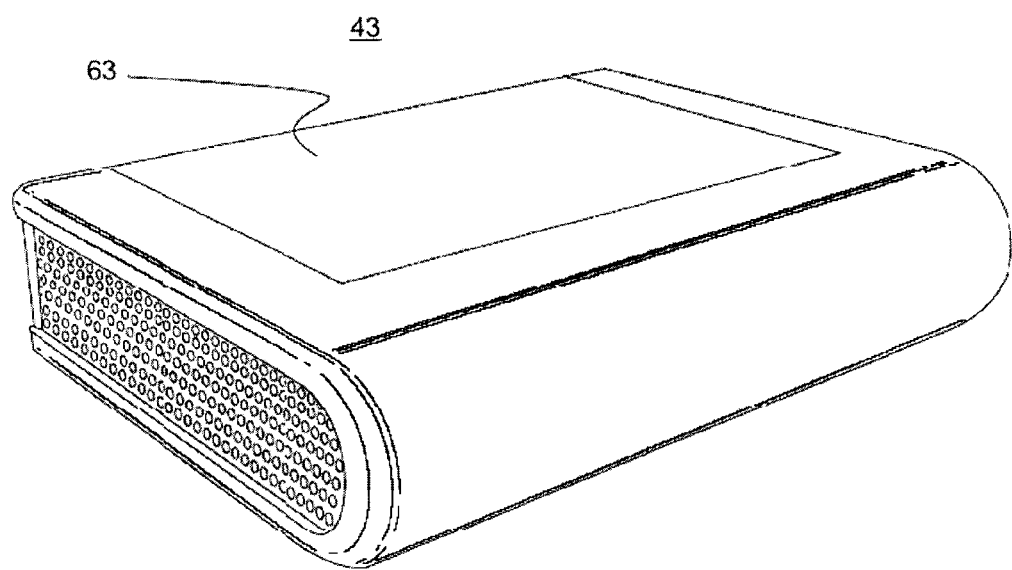
Figure 10:
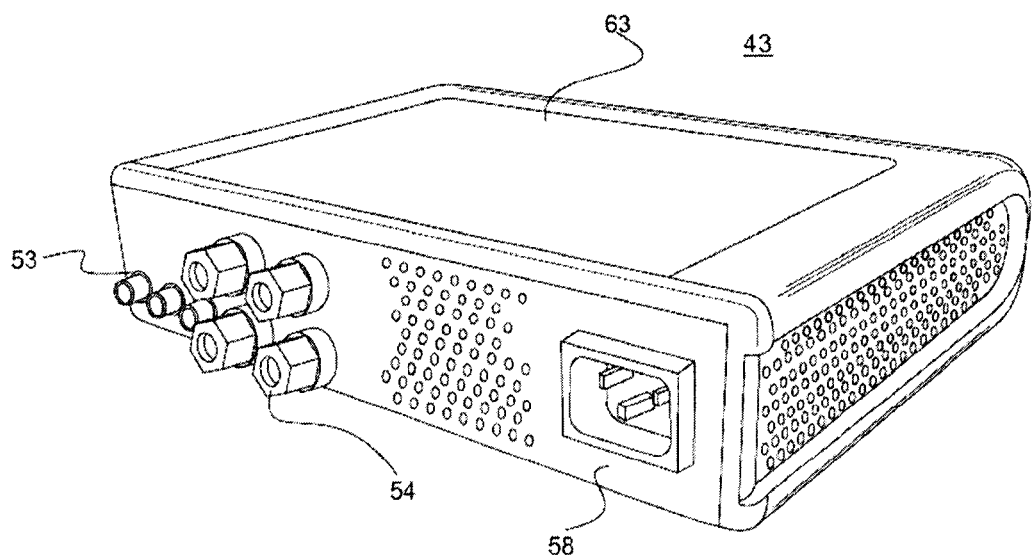

FIGS. 6, 7, 8, 9, and 10 show the audio/video amplifier/access point 43 having a book end form factor that may be seated vertically or horizontally on, for example, a bookshelf. FIG. 6 shows a housing 63 horizontally seated on a flat surface and a supporting unit 65 separated from the housing 63. FIG. 7 shows the housing 63 vertically seated on the supporting unit 65 such that the audio/video amplifier/access point 43 may be used as a book-end. As shown in FIG. 8, the audio-out terminals 53, the video out terminal 59 and the speaker out terminals 54 may be arranged on the back side of the housing 63. It should be noted that any arrangement of terminals may be used. Moreover, additional connections, fewer connections, or different connections are contemplated by the invention. The power supply connection 58 may also be formed on the back surface of the housing 63. Of course battery or Power Over Ethernet (POE) may be employed. Moreover, additional connections, fewer connections, or different connections are contemplated by the invention. As shown in FIGS. 9 and 10, the supporting unit 64 can be removed and the housing 60 can be vertically seated on a flat surface. Finally, although specific protocols and operating systems are described with respect to the invention, any future enhancement to these protocols or any future protocols are contemplated by the invention.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. An internet-protocol (IP) based media access device implemented with Web Services for Devices (WSD) protocol, said media access device comprising:
    a network interface connected to and configured to receive a first source of media data from an IP network implemented with the WSD protocol;
    at least one media terminal configured to at least one of output a signal based on the media data from the first source and receive a media input based on media received from a second source of media data;
    at least one converter coupled between said network interface and said media terminal, wherein said converter is configured to at least one of convert the first source of media data from a digital format to an analog format and convert the second source of media data from an analog format to a digital format;
    an amplifier connected to said converter to amplify the media data from said converter; and
    at least one speaker-out terminal connected to said amplifier.

2. The media access device of claim 1, wherein the first and second sources of media data comprise at least one of video, audio, moving picture, voice and gaming data.

3. The media access device of claim 1, further comprises:
    a heat-sink grill configured to cool the device; and
    a power-in terminal configured to receive power from a power source.

4. The media access device of claim 1, wherein the IP network comprises at least one of a wired and wireless network.

5. The media access device of claim 4, wherein the IP network is at least one of a local area network (LAN) and a wide area network (WAN).

6. The media access device of claim 1, further comprising a processor running an operating system and an application program for implementing the WSD protocol.

7. An automation system comprising the media access device of claim 1 and further comprising a device and a client, the client being configured to control said device and said media access device via an IP network, wherein said client comprises at least one of a television, a personal computer, a personal digital assistant, a control panel and a game controller, and said device comprises at least one of a security system, lighting system, HVAC system, audio/video system, and security camera system.

8. The media access device of claim 7, wherein the first and second sources of media data comprise at least one of video, audio, moving picture, voice and gaming data.

9. An internet-protocol (IP) based media access device implemented with Web Services for Devices (WSD) protocol, said media access device comprising:
    a network interface connected to and configured to receive a first source of media data from an IP network implemented with the WSD protocol;
    a processor running an operating system and an application program configured to implement the WSD protocol;
    at least one media terminal configured to at least one of output a signal based on the media data from the first source and receive a media input based on media received from a second source of media data;
    an amplifier connected to said converter and configured to amplify the media data from said converter; and at least one speaker-out terminal connected to said amplifier.

10. The media access device of claim 9, further comprises:
a heat-sink grill configured to cool said device; and
a power-in terminal configured to receive power from a power source.

11. The media access device of claim 9, wherein the IP network comprises at least one of a wired and wireless network.

12. The media access device of claim 11, wherein the IP network is at least one of local area network (LAN) and a wide area network (WAN).

13. An automation system comprising the media access device of claim 9 further comprising a device and a client, the client being configured to control said device and said media access device via an IP network, wherein said client comprises at least one of a television, a personal computer, a personal digital assistant, a control panel and a game controller, and said device comprises at least one of a security system, lighting system, HVAC system, audio/video system, and security camera system.

14. An automation system comprising said media access device of claim 13 and further comprising means for controlling said media access device via the IP network.

15. The automation system of claim 14, wherein said controlling means comprises at least one of a television, a personal computer, a personal digital assistant, a control panel and a game controller.

* * * * *